US009171475B2

(12) United States Patent
Peinecke et al.

(10) Patent No.: US 9,171,475 B2
(45) Date of Patent: Oct. 27, 2015

(54) METHOD FOR DETERMINING A POTENTIAL CONFLICT SITUATION

(75) Inventors: Niklas Peinecke, Hannover (DE); Alexander Kuenz, Braunschweig (DE)

(73) Assignee: Deutsches Zentrum fuer Luft- und Raumfahrt e.V., Cologne (DE)

( * ) Notice: Subject to any disclaimer, the term of this patent is extended or adjusted under 35 U.S.C. 154(b) by 134 days.

(21) Appl. No.: 13/384,790

(22) PCT Filed: Jul. 21, 2010

(86) PCT No.: PCT/EP2010/004465

§ 371 (c)(1), (2), (4) Date: Mar. 7, 2012

(87) PCT Pub. No.: WO2011/009606

PCT Pub. Date: Jan. 27, 2011

(65) Prior Publication Data

US 2012/0158278 A1 Jun. 21, 2012

(30) Foreign Application Priority Data

Jul. 22, 2009 (DE) ........................ 10 2009 034 455

(51) Int. Cl.

| | |
|---|---|
| ***G06F 19/00*** | (2011.01) |
| ***G06G 7/70*** | (2006.01) |
| ***G06G 7/76*** | (2006.01) |
| ***G08G 5/04*** | (2006.01) |

(52) U.S. Cl.

CPC .................................... *G08G 5/045* (2013.01)

(58) Field of Classification Search

CPC ..... G08G 5/0082; G08G 5/0013; G08G 5/04; G08G 5/045; G08G 5/0026

USPC ........................................................ 701/120

See application file for complete search history.

(56) References Cited

U.S. PATENT DOCUMENTS

| | | | | |
|---|---|---|---|---|
| 5,636,123 A * | 6/1997 | Rich | G01S 5/0072 | 342/29 |
| 6,134,500 A * | 10/2000 | Tang | G06Q 10/047 | 701/10 |
| 6,421,603 B1 * | 7/2002 | Pratt | G01C 21/00 | 244/175 |

(Continued)

FOREIGN PATENT DOCUMENTS

DE 10 2007 032 084 7/2007

OTHER PUBLICATIONS

Mathias et al.; "Insideness and Collision Detection Algorithms"; Proceedings of the Tyrrhenian International Workshop on Digital Communications—Enhanced Surveillance of Aircraft and Vehicles, Sep. 3-5, 2008, pp. 1-7.

*Primary Examiner* — Ian Jen
*Assistant Examiner* — Harry Oh
(74) *Attorney, Agent, or Firm* — Whitham Curtis Christofferson & Cook, PC

(57) ABSTRACT

The invention relates to a method for determining a potential conflict situation (2) between objects within a multidimensional traffic area (1), with the objects each moving on predetermined trajectories (T1 to T11), having the following steps:

a) subdivision of the traffic area (1), with respect to at least one dimension (x, y, z, t) of the traffic area (1), into at least two partial traffic areas (11, 12, 13, 14, 41, 42, 51, 52, 53, 61), and b) repetition of steps a) and b) corresponding to those partial traffic areas (11, 12, 13, 14, 41, 42, 51, 52, 53, 61) which were subdivided in step a) and are influenced by at least two trajectories (T2, T3), with a potential conflict situation (2) between at least two trajectories (T2, T3) which jointly influence a partial traffic area (113) being determined as a function of an extent with respect to at least one dimension (x, y, z, t) of the partial traffic area (113).

8 Claims, 5 Drawing Sheets

(56) References Cited

U.S. PATENT DOCUMENTS

| | | | | |
|---|---|---|---|---|
| 6,577,947 | B1 * | 6/2003 | Kronfeld | G01C 21/00 701/301 |
| 7,194,353 | B1 * | 3/2007 | Baldwin | G01C 21/00 701/301 |
| 7,483,787 | B2 * | 1/2009 | Dehn | G08G 5/0034 345/419 |
| 7,940,259 | B2 * | 5/2011 | Wright | G08G 5/0095 345/418 |
| 8,082,102 | B2 * | 12/2011 | Ravenscroft | G01C 21/005 701/2 |
| 2014/0067245 | A1 * | 3/2014 | Polansky | G08G 5/003 701/121 |
| 2015/0127295 | A1 * | 5/2015 | Teramoto | G01B 21/16 702/150 |

* cited by examiner

METHOD FOR DETERMINING A POTENTIAL CONFLICT SITUATION

FIELD OF THE INVENTION

The invention relates to a method for determining a potential conflict situation between objects within a multidimensional traffic area, with the objects each moving on predetermined trajectories. The invention likewise relates to a computer program having program code means for carrying out the method.

BACKGROUND

As a result of the major requirement for mobility and the continuously increasing number of trade goods to be transported, the traffic load and therefore the load on the infrastructure on which the respective type of traffic is based is also increasing in proportion to this. This can be observed in particular in air traffic since, in this case, long distances can be traveled in a relatively short time, as a result of which a significant increase in the amount of traffic, and therefore an increased traffic load, is predicted with respect to the globalization for the future. Similar developments are in this case also expected in the maritime field.

These traffic areas in particular, such as the maritime field or aviation, are characterized by their high freedom of movement while traveling. For example, the entire three-dimensional flight space is available to an aircraft, as a result of which the number of possible transport paths between two points is virtually infinite. These traffic areas are therefore fundamentally distinguished from other traffic areas, such as roads or rails, while the transport paths or routes are predetermined by the infrastructure itself.

In order to ensure safe flight traffic for the large number of annual flight movements, the freedom of movement which is predetermined by the air space infrastructure is highly regimented by air traffic control. Aircraft fly only within fixed predetermined corridors, with their flight route being defined and fixed. This flight route is in this case also referred to as a trajectory, which indicates the spatial position of the aircraft at different times. In other words, a trajectory contains a series of waypoints which the vehicle must reach at a specific time. If the aircraft is now guided on a four-dimensional trajectory such as this from its take-off airport to its destination airport, and it may deviate from this predetermined trajectory only in the event of danger or in response to instructions from air traffic control.

These four-dimensional predetermined trajectories on which the aircraft must move are intended to prevent aircraft from colliding with one another, with this risk being particularly high near airports. In this case, a hazard or conflict situation does not exist only when the aircraft would actually collide with one another, but even when they fly past one another, relatively close to one another. For example, vortices can contribute to aircraft crashing, even though they have not collided with one another. In order to prevent this, the aircraft must always be separated from one another by a minimum distance as they travel through the traffic area. A conflict situation arises if this minimum separation is not maintained.

By way of example, U.S. Pat. No. 6,421,603 B1 discloses a method by means of which a conflict situation between an aircraft and the terrain over which the aircraft is flying is intended to be identified. For this purpose, a terrain database is created, and contains a maximum and a minimum altitude with respect to relatively large regions. If the trajectory to be flown by the aircraft is now within this region, then the region is further subdivided into smaller regions when the trajectory is below the maximum altitude in that region. Therefore, in the end, the only subregions which are compared with the trajectory are those which are actually also classified as being critical. Furthermore, this document describes how a conflict situation can also be identified by moving severe weather, in that every trajectory segment of the severe weather is compared with each trajectory segment of the aircraft, and a check is carried out to determine whether they overlap in space or time.

One disadvantage in this case, in particular, is the fact that the calculation complexity for trajectory comparison is very high (exponential) because every trajectory segment must be compared with every other trajectory segment of other objects. When there are a large number of objects, this easily results in a level of computation complexity which can no longer be carried out in an adequate time. This is particularly critical when the aim is to monitor air traffic globally.

SUMMARY

With respect thereto, the object of the present invention is to specify an improved method by means of which a check for potential conflicts can be carried out in a very short time even when a large number of objects have to be monitored.

The object is achieved according to the invention by the method of the type mentioned initially, by a) subdivision of the traffic area, with respect to at least one dimension of the traffic area, into at least two partial traffic areas, and b) . . . repetition of steps a) and b) corresponding to those partial traffic areas which were subdivided in step a) and are influenced by at least two trajectories, with a potential conflict situation between at least two trajectories which jointly influence a partial traffic area being determined as a function of an extent with respect to at least one dimension of the partial traffic area.

The invention therefore proposes that a multidimensional traffic area, within which objects move at least partially on predetermined trajectories, it is defined which potential conflicts are identified such that the traffic area is subdivided with respect to at least one dimension into at least two partial traffic areas, to be precise until the respective partial traffic area is now influenced only by one trajectory. However, if the partial traffic area has reached a minimum extent with respect to at least one dimension and if it nevertheless is influenced by at least two trajectories, a potential conflict situation is identified between at least these two trajectories.

An explicit check is subsequently carried out to determine whether an identified potential conflict is actually a real conflict.

For the purposes of the present invention, a traffic area in this case means any area within which objects can move, with the term multidimensionality not just being restricted to the three spatial dimensions. For example, a traffic area may be the air space or else the sea area. In this case, the traffic area is bounded with respect to its dimensional extent such that, for example, the air space for the entire world is limited by the dimensional extent of the degrees of latitude, the degrees of longitude and the altitude.

Since the time component for identification of potential conflicts plays a major role, the term dimension also means the time aspect, as a result of which, for example, the air space as a traffic area has four dimensions for the purposes of the present invention, specifically three spatial dimensions and one time dimension. For clarity reasons, these three spatial dimensions and the time dimension are combined within the term dimension.

This multidimensional traffic area is now subdivided in step a) with respect to at least one of these dimensions into at least two partial traffic areas, with the dimensional extent of the subdivided partial traffic areas preferably corresponding together to the dimensional extent of the traffic area.

Advantageously, the traffic area is subdivided with respect to each of its dimensions into at least two partial traffic areas, such that this results, for example, in a total of 16 partial traffic areas for a four-dimensional traffic area (three spatial dimensions plus one time dimension).

It is very particularly advantageous in this case for the traffic area to be subdivided with respect to one of its dimensions such that the extent with respect to this dimension is halved and is in each case associated with the partial traffic areas. The dimensional extent of the partial traffic areas therefore becomes ever smaller with each subdivision in step a). For example, if the traffic area has an extent from −180° to +180° with respect to the degrees of longitude, and if this traffic area is subdivided into two partial traffic areas in this dimension, then the first traffic area has an extent with respect to the degrees of longitude from −180° to 0°, and the second partial traffic area from 0° to +180°.

This subdivision of the traffic area which is carried out in step a) is now repeated with each of the subdivided partial traffic areas which is influenced by at least two trajectories (step b)). If a partial traffic area is not influenced by any trajectory or by only a single trajectory, then no further subdivision need be carried out for this case, since a potential conflict situation within the dimensional extent of these partial traffic areas can fundamentally be excluded. The partial traffic areas which are influenced by more than one trajectory, however, may potentially contain a conflict situation within their dimensional extent (both from the spatial and from the temporal point of view). The method is repeated with these partial traffic areas which are influenced by more than one trajectory, to be precise until the respective partial traffic area is influenced by no more than one trajectory. In other words, this means that, in principle, the only partial traffic areas which are considered are those which could contain a potential conflict situation.

The subdivision in step a) reduces the dimensional extent of a partial traffic area with respect to the traffic area. If one partial traffic area has reached a corresponding minimum extent with respect to at least one dimensional extent, and if it also is still influenced by at least two trajectories, then, in principle, a conflict situation can be deduced between these trajectories, and therefore between the objects associated with these trajectories. In other words, as long as one partial traffic area is influenced by more than two trajectories and has not yet reached a minimum extent with respect to one dimension, this partial traffic area is further subdivided in step a), with this iteration being continued until every partial traffic area is now influenced only by a maximum of one trajectory, or a minimum extent has been reached. In step b), the partial traffic areas are therefore inserted as traffic areas into step a), and are further subdivided.

Two trajectories are separated from one another and therefore no potential conflict situation exists when they are either sufficiently spatially separated from one another for all the common points in time or there is a sufficient time separation between them for all the common spatial points. In this case, it has been found that a spatial lateral separation of 5 NM (nautical miles) and a spatial vertical separation of 1000 ft may be considered to be sufficient for the first condition, in order to negate a conflict situation. By way of example, 90 seconds has been found to be adequate as the time separation for all common spatial points for the second condition. The required time separation between aircraft is dependent, for example, on the wind separation, the vortex wake classes, or other parameters which influence the vortex wake. It is now particularly advantageous for the minimum extent of a partial traffic area to be identified as a function of its potential conflict situation, defined as a function of these separation limits. Instead of the cited 90 seconds, an equivalent for the common point in time, for example 5 seconds, can be used as a time separation distance. In this case, it is sufficient for one of the two conditions to be checked, since the other is implemented and ensures an adequate 3D separation at all points in time.

Furthermore, it is very particularly advantageous for the dimensional extent of the traffic area to be defined as a function of this minimum extent, on the basis of which a potential conflict situation is defined. The dimensional extent of the traffic area therefore need not match the actual extent, but is defined with respect to the minimum extent, as a result of which all the subdivided partial traffic areas reach their minimum extent with respect to each of their dimensions after a fixed predetermined number of subdivisions. In other words, the minimum extent in each dimension is therefore reached at the same time for all the partial traffic areas subdivided in step a). However, the minimum extent is reached at the same time only when using orthogonal coordinate systems for all the partial traffic areas. Particularly in the case of air traffic, when the orientation is based on a model of the Earth, the problem arises that the degrees of longitude are closer together nearer the poles. The minimum extent with respect to the degree of longitude is reached earlier at the poles.

A partial traffic area may in this case be considered to be influenced by a trajectory if at least a part of the trajectory is within the dimensional extent of the partial traffic area, that is to say when at least one waypoint is within the dimensional extent of the partial traffic area, with respect to its spatial extent or its time component.

However, a partial traffic area may also be considered to be influenced by a trajectory when the trajectory is not within the dimensional extent of the partial traffic area but is at least partially within an adjacent partial traffic area which is adjacent to this partial traffic area. This is because it has been found that a potential conflict situation between two trajectories can also occur when the trajectories still influence one another despite not being located within a common partial traffic area, because they are so close to the boundary of the respective partial traffic area that they are separated by less than a minimum distance. It is therefore very particularly advantageous for a partial traffic area to be considered to be influenced by a trajectory when the trajectory is admittedly within an adjacent partial traffic area which is adjacent to this partial traffic area, but is within or below a minimum separation from this partial traffic area in the adjacent traffic area. In this case, the trajectory also influences this first partial traffic area.

In this case, it is possible for one partial traffic area to be influenced by two trajectories, neither of which is within the spatial extent of the partial traffic area, but are each in adjacent partial traffic areas adjacent to this partial traffic area. In a situation such as this, this influenced partial traffic area does not need to be subdivided any further, as a result of which it is very particularly advantageous for step b) to be carried out only when the partial traffic area is influenced by at least two trajectories of which, however, at least one trajectory is within the spatial extent of the partial traffic area. Partial traffic areas which are influenced only by adjacent trajectories do not need to be subdivided in step a), as a result of which step b) is not carried out.

Furthermore, it is very particularly advantageous for the potential conflict situation furthermore also to be carried out as a function of the distance between the trajectories. For example, if one partial traffic area is influenced by two trajectories and if the partial traffic area reaches a minimum extent with respect to its dimensional extent, then the distance between the trajectories within this partial traffic area can be determined, thus identifying a potential conflict situation as a function of this determined separation. This is because it has been found that trajectories which are sufficiently far apart from one another and for which there is therefore no potential conflict situation can influence a common partial traffic area.

In order to further reduce the calculation time, it is very highly advantageous for the trajectories which influence the respective partial traffic area on the basis of the above conditions to be associated with each partial traffic area in step a) after the subdivision of the traffic area into its partial traffic areas. A check is then carried out for each partial traffic area in step b) to determine how many trajectories are associated with the respective partial traffic area, and step a) is then repeated with those partial traffic areas with which at least two trajectories are associated, with step a) then being based only on this partial traffic area and its associated trajectories. The other trajectories which were not associated with this partial traffic area are in this case ignored. The potential conflict situation is then identified when the partial traffic area has reached its minimum extent and at least two trajectories are associated with it. This association advantageously reduces the computation complexity since it is no longer necessary to check every trajectory with the respective partial traffic areas.

BRIEF DESCRIPTION OF THE DRAWINGS

The invention will be explained in more detail with reference, by way of example, to the attached drawing, in which.

DETAILED DESCRIPTION

Figure 1:
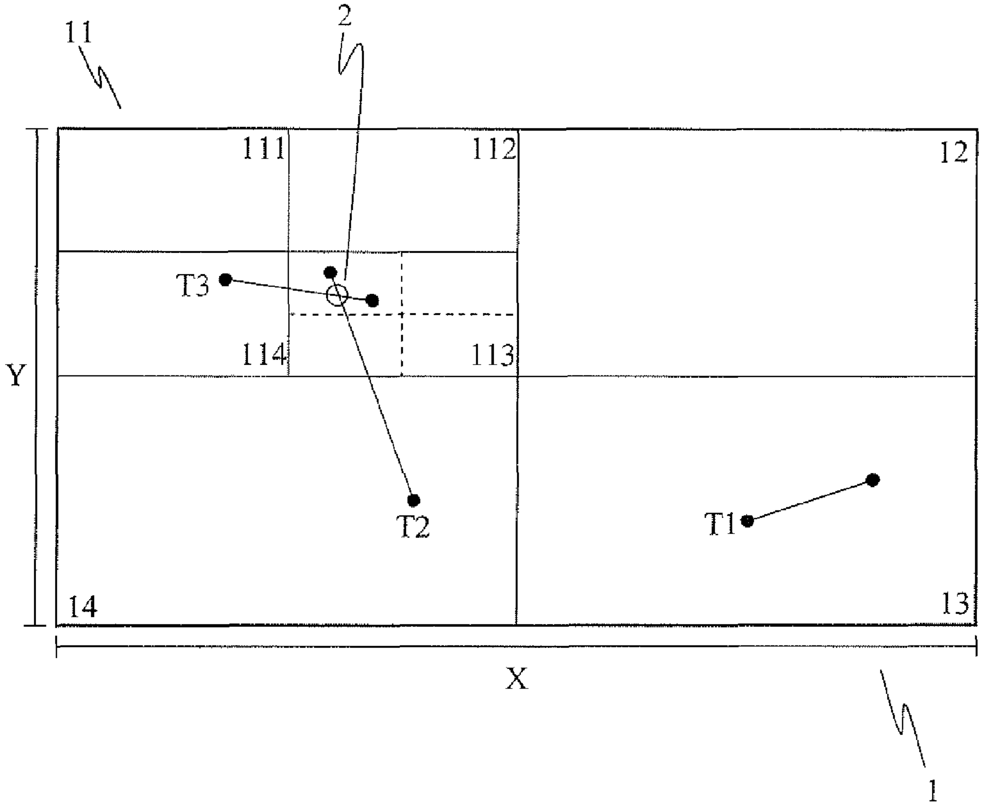
FIG. 1 shows a schematic illustration of a traffic area having three trajectories.

FIG. 1 shows the schematic illustration of a traffic area 1 within which there are three trajectories T1, T2, T3. For the sake of simplicity, the traffic area 1 is illustrated only with respect to its two spatial dimensions x and y, with x forming the degree of longitude and y the degree of latitude. The two further dimensions z for the altitude and t for the time are ignored here. In this case, by way of example, the extent of the traffic area 1 may correspond to the entire world, thus resulting in a range from −180° to +180° for x (degree of longitude) and a range from −90° to +90° for y (degree of latitude).

There are now at least two trajectories within the traffic area 1, specifically T1, T2 and T3, as a result of which this traffic area is now subdivided into in each case two partial traffic areas 11, 12, 13, 14 with respect to each of its dimensions. The partial traffic area 12 is in this case not influenced by any of the three trajectories T1, T2, T3, as a result of which there is no need to repeat the subdivision in this case. Furthermore, the partial traffic areas 13 are each influenced by only one trajectory, as a result of which no potential conflict situation can arise in these two traffic areas, either.

In contrast, the partial traffic area 11 is influenced both by the trajectory T2 and by the trajectory 13, since both trajectories are at least partially within the dimensional extent of the partial traffic area 11. In this case, it is necessary to further subdivide the partial traffic area 11, to be precise into the respective partial traffic areas 111, 112, 113, 114. Once the partial traffic area 11 has been subdivided into its respective partial traffic areas 111, 112, 113, 114, it is then possible to tell that there are no trajectories in the partial traffic areas 111 and 112, as a result of which no further subdivision is required here. There is likewise no need for any further subdivision in the partial traffic area 114 either, which is influenced only partially by the trajectory 13. Further subdivision is necessary only in the partial traffic area 113 which is influenced at least partially by the trajectory T2 and trajectory T3, as a result of which the method is continued further in the present manner with the partial traffic area 113.

Since the two trajectories T2 and T3 intersect in the area 2, and there is therefore a potential conflict situation in this area 2, it is found after a number of further subdivisions of the partial traffic area 113 that one of the partial traffic areas has reached a minimum extent with respect to its dimensional extent, and is influenced by both the trajectories T2 and T3. In this case, a potential conflict situation is deduced between the trajectory T2 and T3 within this partial traffic area. This method can now be extended to the other dimensions, as well.

After identification of potential conflict situations, a check is explicitly carried out to determine whether a potential conflict is actually a conflict.

Figure 2:
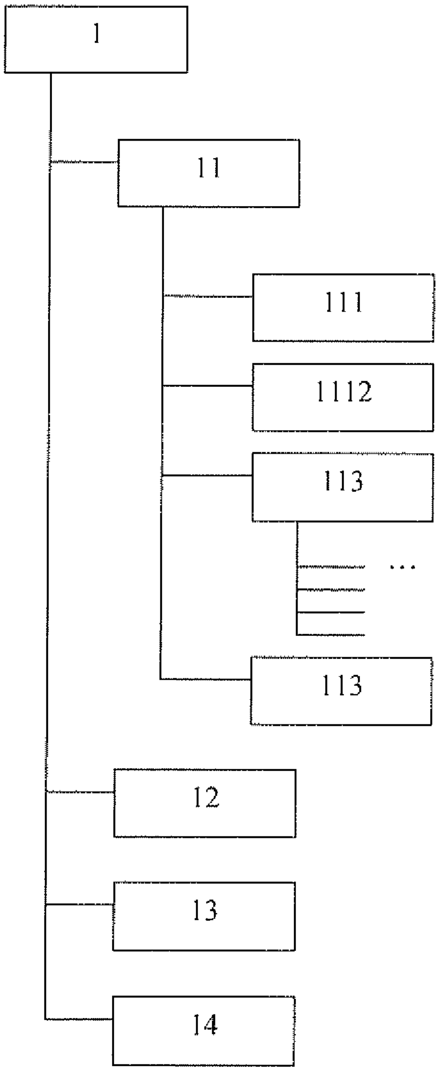
FIG. 2 shows an illustration of a tree structure which results from the example in FIG. 1.

This procedure of subdivision of the traffic areas into further partial traffic areas results in a tree structure, as is illustrated in FIG. 2 for the exemplary embodiment in FIG. 1. The root node in this case corresponds to the entire traffic area 1 within which the three trajectories T1, T2 and T3 are located. Since two partial traffic areas are subdivided for each dimension of the traffic area 1, this results in a total of four daughter nodes, which each correspond to the partial traffic areas 11, 13 and 14. Since the partial traffic areas or nodes 13, 14 are influenced by no more than one trajectory, these nodes are not further subdivided. Only that node or partial traffic area 11 which is influenced by the two trajectories T2 and T3 is subdivided further into its daughter nodes 111, 112, 113, 114. This subdivision is in this case continued until either none of the leaf nodes are influenced by no more than one trajectory, or a minimum extent has been reached. In this case, a leaf node means those nodes with which no further daughter nodes are associated. If one of the leaf nodes has a minimum extent and, furthermore, is influenced by more than one trajectory, then there is a conflict situation within this node, and therefore in this partial traffic area which corresponds to it. The partial traffic area 12 is not created, since this is not influenced. A partial traffic area is created only when it is influenced. This considerably reduces the memory requirement.

Figure 3:
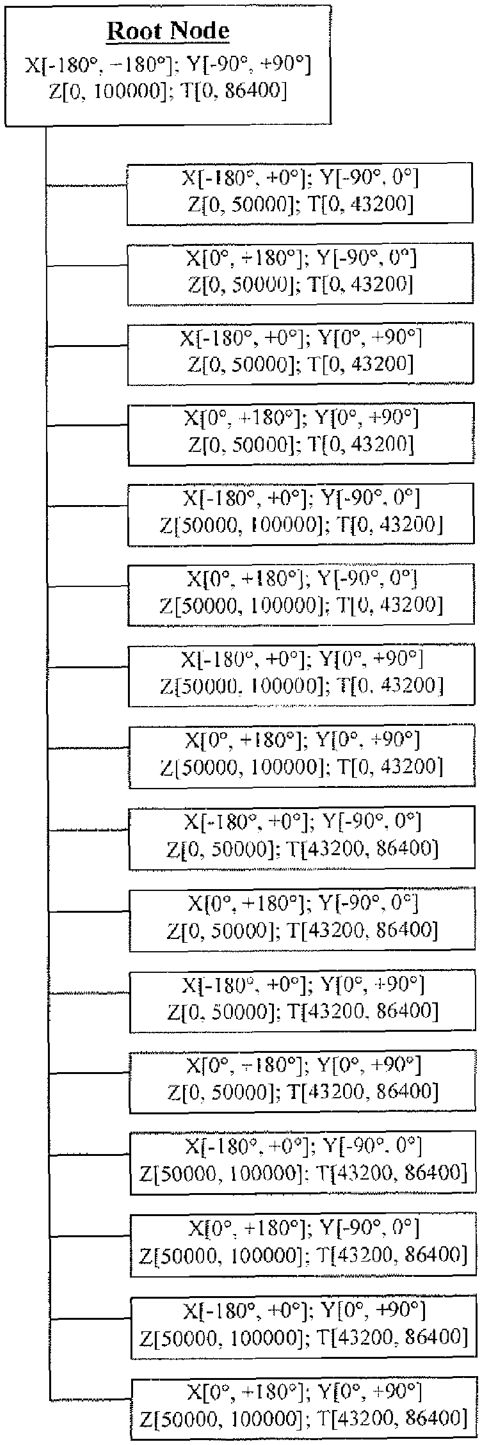
FIG. 3 shows a schematic illustration of a tree and its first level in all four dimensions.

FIG. 3 schematically shows the illustration of a tree such as this and its first level, in which the traffic area has been subdivided in all four dimensions. Since the subdivision is carried out into each of the four dimensions, this results for a four-dimensional traffic area in 16 partial traffic areas, with each of which the trajectories which influence the respective partial traffic area are then associated. It is therefore possible when there are a multiplicity of four-dimensional trajectories to find out very efficiently and quickly whether and where there is a potential conflict situation. Because of the four-dimensional character of the trajectories, a simple comparison of the trajectories with one another will be impossible with adequate calculation complexity. However, this tree structure allows a calculation complexity of approximately n*log(n), which can be carried out in an adequate time even when there are a large number of four-dimensional trajectories.

By way of example for a traffic area which comprises the entire world, the following table shows the number of partial traffic areas which would be created for each dimension when the stated minimum extent was reached. For example, an overall extent of the traffic area from −180° C. to +180° is assumed for the degree of longitude x, with the minimum extent being 5 NM, which corresponds to precisely 1/12 degree at the equator. If there are two trajectories within the minimum extent thereof, then a conflict situation exists. With an extent of 360° and a minimum extent of 1/12 degree, this results in a total of 4320 partial traffic areas, which correspond to the minimum extent, to be precise with respect to this dimension. This would correspond to about 12 node levels, that is to say 12 subdivisions would be carried out. For the degree of latitude y, which has an extent from only −90° to +90°, this therefore results, with the same minimum extent of 5 NM, in only 2160 partial traffic areas with a minimum extent, which corresponds to about 11 node levels or iteration steps. With an assumed maximum altitude of 100 000 ft and a minimum extent of 1000 ft, this results in 100 partial traffic areas per minimum extent in this dimension, which corresponds to only to seven iteration steps or node levels. In contrast, in the time dimension, 14 node levels are required to reach the minimum extent.

| | Extent | Minimum Extent | max. Number of partial traffic areas | Node levels |
|---|---|---|---|---|
| X Longitude | [−180°, +180°] | 5 NM (1/12°) | 4320 | 12 |
| Y Latitude | [−90°, +90°] | 5 NM (1/12°) | 2160 | 11 |
| Z Altitude | [0, 100000] | 1000 ft | 100 | 7 |
| T Time | [0, 86400] | 5 s | 17280 | 14 |

In this case, the time extent corresponds to one entire day in seconds.

As can be seen, a greater resolution than the minimum extent is achieved for some dimensions in the present case, before the corresponding minimum extent is reached in another dimension. For example, in the case of the altitude, the minimum extent is achieved after just seven iteration steps, while twice as many iteration steps are required for the time. In the end, this would mean that a series of partial traffic areas will be subdivided whose subdivision was entirely unnecessary. In order to solve this problem, it is proposed that the initial extent of the traffic area be extended in a direction resulting in the following table. In this case, in this exemplary embodiment, the minimum extent in a partial traffic area is reached in all four dimensions after just 14 iteration steps.

| | Extent | Minimum extent | max. Number of partial traffic areas | Node levels |
|---|---|---|---|---|
| X Longitude | [−180°, +1260°] | 5 NM (1/12°) | 17280 | 14 |
| Y Latitude | [−90°, +1350°] | 5 NM (1/12°) | 17280 | 14 |
| Z Altitude | [0, 17280000] | 1000 ft | 17280 | 14 |
| T Time | [0, 86400] | 5 s | 17280 | 14 |

Since partial traffic areas whose boundaries are beyond the physical boundaries of the traffic area are subdivided specifically for the first subdivisions, these are ignored in the following iteration steps since there are also no trajectories for them which could influence these traffic areas. This means that the number of nodes in the tree can be kept relatively small and constant.

Figure 4:
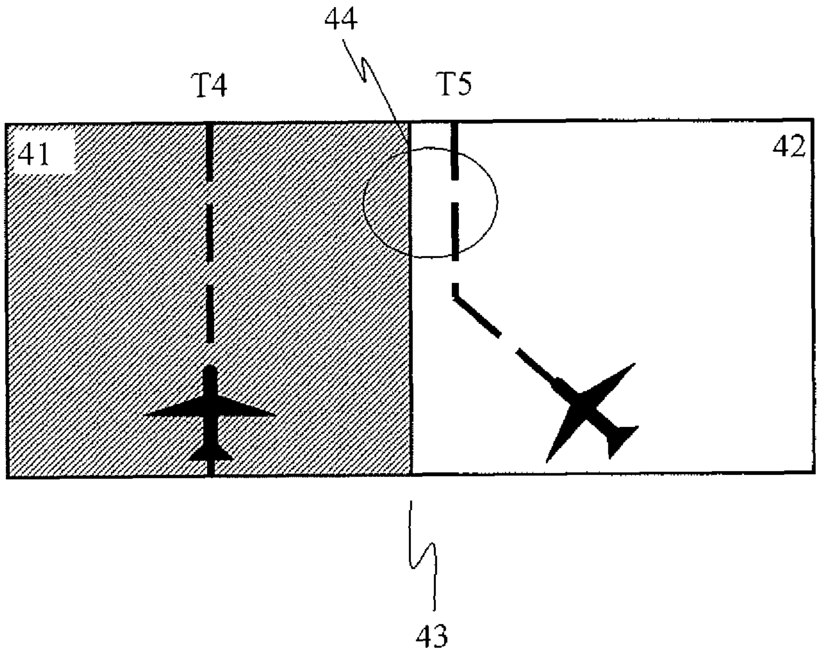
FIG. 4 shows an illustration of a traffic area being influenced by a plurality of trajectories.

FIG. 4 illustrates a plurality of trajectories T4 and T5 influencing one partial traffic area. In this case, the partial traffic area 41 is influenced by the two trajectories T4 and T5, with the trajectory T4 being within the dimensional extent of the partial traffic area 41, while, although the trajectory T5 is within the dimensional extent of a partial traffic area 42 which is adjacent to the partial traffic area 41, it is not sufficiently close to the boundary 43 to influence the partial traffic area 41. Such influencing of partial traffic areas 41 by adjacent trajectories T5 in adjacent partial traffic areas 42 occurs when the adjacent trajectories T5 are below the minimum extent with respect to the boundary 43.

This is because, in a situation such as this, the partial traffic area 41 must be further subdivided if it has itself not yet reached its minimum extent. If the partial traffic area has reached its minimum extent, there is a potential conflict situation. However, if it could be subdivided even further, then a check must be carried out in further repetitions to determine whether there is a conflict situation in the end.

In this case, a partial traffic area 41 is subdivided further only if at least one of the trajectories T4, T5 which influence this partial traffic area 41 is within the dimensional extent thereof. However, if both trajectories are adjacent trajectories, then the partial traffic area is admittedly influenced by both trajectories, but a potential conflict situation can be excluded, and the partial traffic area does not need to be subdivided any further. This example is shown in FIG. 5.

Figure 5:
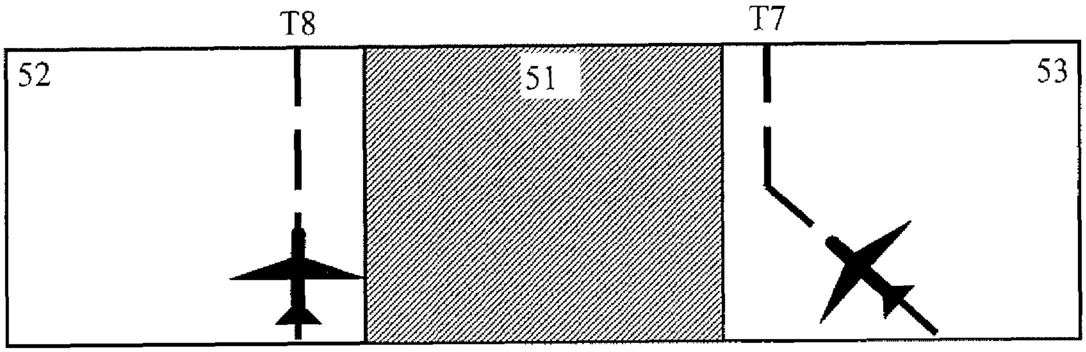
FIG. 5 shows a traffic area being influenced by adjacent trajectories.

FIG. 5 shows a partial traffic area 51 which in each case has an adjacent partial traffic area 52 and 53 to the left and right. A trajectory T8 which is below the minimum extent of the boundary to the partial traffic area 51 is located in the adjacent partial traffic area 52. A trajectory T7 is likewise located in the partial traffic area 53, and is likewise below the minimum extent with respect to the boundary of the partial traffic area 51. Both trajectories T7 and T8 therefore influence the partial traffic area 51, although neither of the two trajectories is within the dimensional extent of the partial traffic area 51. Since the partial traffic area 51 can at most reach the minimum extent, a potential conflict situation between the trajectories T7 and T8 and the partial traffic area 51 is therefore fundamentally precluded, as a result of which there is no need to further subdivide the partial traffic area 51.

Figure 6:
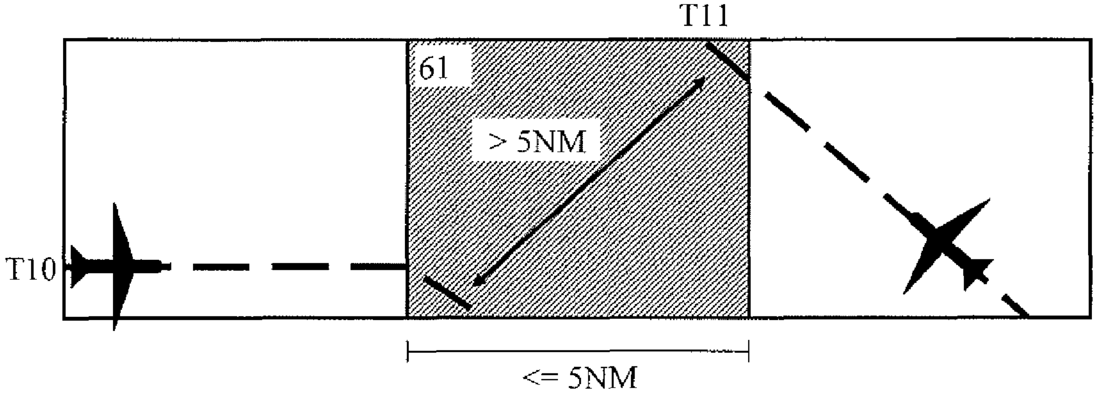
FIG. 6 shows a schematic illustration of a potential conflict identification within a partial traffic area which is influenced by two trajectories.

Finally, FIG. 6 shows the identification of possible conflicts within a partial traffic area 61 which is influenced by two trajectories T10 and T11. In this case, both trajectories T10 and T11 are at least partially within the dimensional extent of the partial traffic area 61, as a result of which they also influence it, thus possibly resulting in a potential conflict situation, if the partial traffic area 61 cannot be further subdivided, that is to say it has reached its minimum extent with respect to that dimension. In a situation such as this, these trajectories can now be used to check whether the two trajectories are actually sufficiently close to one another within the partial traffic area 61 to result in a potential conflict situation.

In the exemplary embodiment shown in FIG. 6, the trajectories are situated more than a minimum distance apart from one another, which is defined just as advantageously, as the minimum extent of the partial traffic areas. In other words, in the partial traffic area 61, the two trajectories T10 and T11 are separated laterally by more than 5 NM, as a result of which there is no potential conflict situation.

Therefore, in the end, it is possible using this method to determine in a few milliseconds whether a potential conflict situation exists, even in the case of large scenarios with large spatial extents and a multiplicity of objects to be monitored. In this case, an existing tree can be extended very efficiently by the addition of new trajectories, and can be reduced by deletion of trajectories which are no longer current.

The invention claimed is:

1. A method for determining a potential conflict situation between objects within a multidimensional traffic area, with the objects each moving on predetermined trajectories, comprising steps of:

dividing a four-dimensional traffic area having the three spatial dimensions and one time dimension with respect to each of its dimensions into a total of 16 partial traffic areas, the 16 partial traffic areas each having a reduced dimensional extent in each dimension of the four dimensions as compared to a dimensional extent of the traffic area in each respective dimension of the four dimensions;

for each partial traffic area influenced by at least two of the predetermined trajectories, repeating the dividing step with the partial traffic area inserted as the traffic area to be divided, wherein the repeating continues until every partial traffic area is either influenced by a maximum of one trajectory or has a reduced dimensional extent in each dimension of the four dimensions which has reached a minimum extent for each respective dimension; and identifying a potential conflict situation between the objects when at least two trajectories of the predetermined trajectories jointly influence a partial traffic area which has a reduced dimensional extent in each dimension of the four dimensions which has reached the minimum extent for each respective dimension, wherein the at least two predetermined trajectories are travel routes each indicating a spatial position of an object at different times, and wherein the traffic areas and partial traffic areas are at least three-dimensional physical spaces through which objects and trajectories are capable of passing.

2. The method as claimed in claim 1, wherein in the dividing step, the dimensional extent of the traffic area is halved to give the reduced dimensional extent of each of the 16 partial traffic areas.

3. The method as claimed in claim 1, wherein a partial traffic area is influenced by a trajectory when at least a part of the trajectory is within the reduced dimensional extent of the partial traffic area.

4. The method as claimed in claim 1, wherein a first partial traffic area is influenced by a trajectory when at least a part of the trajectory is within a second partial traffic area, which is adjacent to the first partial traffic area.

5. The method as claimed in claim 4, wherein the first partial traffic area is influenced by the trajectory when at least a part of the trajectory which is located in the adjacent second partial traffic area is less than a minimum distance from the first partial traffic area with respect to at least one dimension of the four dimensions.

6. The method as claimed in claim 1, wherein said identifying step includes determination of the potential conflict situation as a function of a distance between the at least two trajectories which influence the partial traffic area, the distance being taken with respect to at least one dimension of the four dimensions.

7. The method as claimed in claim 1, further comprising a step of associating each partial traffic area after the dividing step with trajectories which influence the respective partial traffic area, and wherein said repeating step ignores trajectories which do not influence the respective partial traffic area which is inserted as the traffic area to be divided.

8. A non-transitory machine-readable storage medium having stored therein a computer program which, when run on a computer, causes the computer to perform steps of:

dividing a four-dimensional traffic area having the three spatial dimensions and one time dimension with respect to each of its dimensions into a total of 16 partial traffic areas, the 16 partial traffic areas each having a reduced dimensional extent in each dimension of the four dimensions as compared to a dimensional extent of the traffic area in each respective dimension of the four dimensions;

for each partial traffic area influenced by at least two predetermined trajectories, repeating the dividing step with the partial traffic area inserted as the traffic area to be divided, wherein the repeating continues until every partial traffic area is either influenced by a maximum of one trajectory or has a reduced dimensional extent in each dimension of the four dimensions which has reached a minimum extent for each respective dimension; and identifying a potential conflict situation between objects when at least two trajectories of the predetermined trajectories jointly influence a partial traffic area which has a reduced dimensional extent in each dimension of four dimensions which has reached the minimum extent for each respective dimension, wherein the at least two predetermined trajectories are travel routes each indicating a spatial position of an object at different times, and wherein the traffic areas and partial traffic areas are at least three-dimensional physical spaces through which objects and trajectories are capable of passing.

* * * * *